United States Patent Office 3,427,301
Patented Feb. 11, 1969

3,427,301
CROSSLINKING OF COLLAGENS EMPLOYING A REDOX SYSTEM COMPRISING PERSULPHATE AND A REDUCING AGENT
Howard L. Needles, Pinole, and Robert E. Whitfield, Pleasant Hill, Calif., assignors to the United States of America as represented by the Secretary of Agriculture
No Drawing. Filed Apr. 6, 1966, Ser. No. 540,504
U.S. Cl. 260—117   3 Claims
Int. Cl. C09h 11/00

ABSTRACT OF THE DISCLOSURE

Gelatin or other collagen is cross-linked by reacting it with about 0.1 to 2 parts of a persulphate per part of collagen. By adding a reducing agent such as silver nitrate to the system, the reaction can be conducted at room temperature or slightly above, i.e., 20–40° C. The products are useful as coatings and sizings for paper, fabrics, yarns, etc.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for crosslinking gelatin and other collagens. Further objects of the invention will be evident from the following description wherein parts and percentages are by weight unless otherwise specified.

In accordance with the invention collagens are cross-linked by reaction with a persulphate. The process is relatively simple and involves heating of an aqueous dispersion containing the collagen and a persulphate. The expression "dispersion" is used herein in a generic sense to include solutions, suspensions, and emulsions. Usually, the persulphate is ammonium, sodium, or potassium persulphate. However, the only critical requirement is that the persulphate ion be furnished and thus one can use any salt of persulphuric acid which is water-soluble and which furnishes the persulphate ion in water solution. The persulphate does not act in a catalytic capacity but is used up in the reaction. Accordingly, more than catalytic amounts of persulphate are required. In general, the amount of persulphate can be varied in the range from about 0.1 to about 2 parts of persulphate per part of collagen. However, it has been observed that at high levels of persulphate, the protein may become degraded if heated after a gel has been formed and for this reason it is preferred to use at most about 0.5 part of persulphate per part of collagen. With regard to temperature, the crosslinking does not occur to any significant extent at room temperature, and it is necessary to heat the reaction system to at least 50° C. to achieve a useful rate of crosslinking. As the temperature is increased above 50° C., the rate increases markedly. Usually, temperatures over 100° C. are avoided as they would require a pressure vessel (to keep the water in the liquid state) and offer no special benefit. However, the crosslinking can be effected at any elevated temperature below that at which decomposition of the protein occurs. In general, temperatures of about 70–85° C. are preferred as permitting use of open containers and as yielding crosslinking at a rapid rate. The time of reaction will vary with such conditions as the type of collagen, the proportion of persulphate, temperature, etc. In general, the reaction can best be followed by observation of the reaction system and terminating the process when a substantial increase in viscosity is achieved or when the system forms a gel. The product can be isolated from the reaction system by conventional procedures, for example, washing with water to remove inorganic salts and drying of the product in air or in an oven. For preparing a purer product, dialysis procedures may be employed.

Gelatin is a preferred starting material for the process of the invention but is by no means the only material which can be used. In its broad ambit, the invention can be applied to any collagen, for example, gelatin; modified gelatins such as acetylated-, methylated- or ethylated-gelatin; animal glues; purified proteins prepared by extraction of hides, bones, and other animal parts, etc.

The crosslinking which occurs in the process is believed to involve the following mechanism: Initially, the persulphate decomposes to hydroxy and sulphate free radicals. These attack active sites on the protein side-chains to yield reactive groups which crosslink with other reactive sites on adjacent protein chains. The net result is an increase in molecular weight of the protein.

The crosslinked collagens prepared in accordance with the invention are useful as coatings and sizings for paper, fabrics, yarns, etc. and as supports for silver halides in photographic films. A valuable property of the gelled products of the invention is that they retain their gel structure at temperatures where the original protein would be liquid. The process of the invention is also useful to upgrade collagenous materials—that is, to increase their molecular weight—so as to improve their properties required in bonding, adhering, and sizing applications.

An especially valuable aspect of the invention lies in its application to produce protein gels in situ at a selected locus, for example, on or within substrates such as paper, yarns, fabrics, or other textile materials. The fact that heat is required to effect crosslinking in the aqueous dispersion of collagen and persulphate offers the special benefit that such dispersions can be prepared and held in the unreacted state until it is desired to effect the crosslinking, at which time heat is applied. For example, in conducting sizing, adhering, and laminating procedures, the dispersion may be prepared and held for extended periods of time at room temperature without gelling. In other words, the dispersions exhibit a long pot-like. For use, the dispersion can then be applied to the substrate to be treated. On heating of the substrate the crosslinking takes place and the desired sizing, adhering, or laminating effect is achieved. In a typical example of this technique, fibrous material such as fabric or yarn is impregnated with the dispersion at room temperature, using a conventional dip and pad technique, and the treated material cured to crosslink the collagen in situ on the fibers of the material. The curing may be done, for example, by heating the treated material in an oven at about 80°–150° C. or in a chamber filled with live steam for 5–30 minutes. The material may then be washed to remove unreacted materials and soluble reaction products, then dried and otherwise conventionally processed. The treatment may be applied to such fibrous materials as animal hides and leather; silk; animal hair, mohair; cotton; sisal; hemp; jute; ramie; flax; wood; paper; synthetic cellulosic fibers such as viscose, cellulose acetate, cellulose acetate-butyrate, saponified cellulose acetate, cupra-ammonium rayons, ethyl cellulose; inorganic fibrous materials such as glass fibers and asbestos; organic non-cellulosic fibers such as polyethylene terephthalate, polyacrylontrile, polyethylene, polypropylene, polyvinyl chloride, polyvinylidene chloride, nylon, polyurethanes; etc. The invention may be applied to such fibrous materials in any state such as bulk fibers, staple fibers, slivers, yarns, woven or knitted textiles, felts, fabricated articles such as garments and garment parts. The application of the invention may be for the purpose of obtaining any of a wide variety of functional or decorative effects such as sizing, increasing gloss or transparency, increasing water-, oil-, or soil-repellency, increasing adhesion or bonding characteristics of the substrates with rubber or other elastomers, etc.

If for any reason it is desired to conduct the crosslinking at decreased temperatures, one may add to the reaction system (aqueous dispersion of collagen and persulphate) a substance which, in combination with the persulphate, forms a redox system. This technique, which forms a special modification of the invention, involves simply adding to the reaction system a compound such as an alkali-metal bisulphite, an alkali-metal sulphite or bisulphite; sulphur dioxide; sulphurous acid; a ferrous salt such as the ethylenediaminetetraacetate, sulphate, or acetate; a hydrazine salt such as hydrazine sulphate or chloride; silver nitrate; or other water-soluble substance which acts as a reducing agent and interacts with the persulphate to yield the desired free radicals. Where the reaction is conducted in the presence of such redox system, the crosslinking takes place at room temperature or slightly above, i.e., 20–40° C.

The invention is further demonstrated by the following illustrative examples. In some of the runs, procedures outside the scope of the invention were included for purposes of comparison.

EXAMPLE I

Crosslinking of gelatin

The gelatin used in these experiments was an acid processed, U.S.P. grade gelatin, with a Bloom rating of 175. A 5% solution in water gave a pH of 5.3 and an inherent viscosity of 0.220 dl./g. at 70° C.

(A) Crosslinking with ammonium persulfate.—To 1.25 g. of gelatin dissolved in 25 ml. of water was added 0.228 g. of ammonium persulfate. The solution set to a thick gel after heating at 70° C. for 20 minutes. Dialysis of the gel, followed by evaporation of water at reduced pressure yielded brittle gelatin sheets which were insoluble in hot water, acetic acid, and glycerol. Unreacted gelatin was soluble in each of these hot solvents.

(B) Samples of untreated gelatin and samples of crosslinked gelatin produced as above described (but extending the reaction time to 1 hour) were subjected to chemical analysis. The results are tabulated below:

| Material | Total N, percent | Van Slyke N, percent | Amide N, percent | Total S, percent |
| --- | --- | --- | --- | --- |
| Untreated gelatin | 17.3 | 0.57 | 0.52 | 0.55 |
| Treated gelatin | 17.1 | 0.55 | 0.52 | 0.95 |

An important item in the above analyses is the fact that the treated gelatin has an increased sulphur content. This shows that there is actual chemical combination of the gelatin and persulphate.

(C) Crosslinking with ammonium persulfate (in lower concentration).—The procedure of part A was repeated, employing 0.114 g. of ammonium persulfate. A similar result was obtained, the solution crosslinking to a thick gel in 45 minutes. Iodometric titration showed that 34% of the persulfate had decomposed in 45 minutes.

(D) Crosslinking with persulfate (in higher concentration).—The procedure of part A was repeated, employing 2.28 g. of ammonium persulfate. The solution gelled almost immediately at 70° C.

(E) Crosslinking with potassium persulfate.—The procedure of part A was repeated but substituting 0.270 g. of potassium persulfate for ammonium persulfate. A similar result was obtained, the solution gelling in 15 minutes.

(F) Crosslinking with potassium persulfate (in lower concentration).—The procedure of part A was repeated but substituting 0.135 g. of potassium persulfate for ammonium persulfate. The solution gelled in 40 minutes.

(G) Effect of heat alone.—A solution of 1.25 g. of gelatin in 25 ml. of water was heated at 70° C. The solution showed a mild decrease in viscosity with time, and neither insolubilization nor gelation of the gelatin was observed.

EXAMPLE II

Crosslinking of acetylated gelatin (A) Preparation of acetylated gelatin.—A mixture of 10.0 g. of gelatin dissolved in 200 ml. of water, 30 g. of sodium acetate, and 17.0 g. of acetic anhydride was stirred for 30 minutes at 35° C. The solution was dialyzed 6 days to remove salts, and finally the water was removed at reduced pressure to yield the acetylated gelatin. This gelatin had the following chemical analysis:

Analysis.—Total nitrogen, 17.3%; amide nitrogen, 0.34%; Van Slyke nitrogen, <0.01%.

A 5% solution of the acetylated gelatin in water at 70° C. had an inherent viscosity of 0.236 dl./g.

(B) Crosslinking of acetylated gelatin.—A mixture of 1.25 g. of acetylated gelatin and 0.135 g. of potassium persulfate in 25 ml. of water was heated at 70° C. The solution set to a thick gel in 35 minutes. The product was insoluble in hot water, acetic acid, and glycerol.

EXAMPLE III

Crosslinking of esterified gelatin (A) Preparation of esterified gelatin.—A mixture of 10.0 g. of gelatin, 200 ml. of absolute methanol, and 2 ml. of 37% hydrochloric acid was stirred for 4 days at room temperature. The resulting esterified gelatin was separated from the solution by filtration, washed with more absolute methanol, and dried in a dessicator. A 5% solution of this gelatin in water at 70° C. gave an inherent viscosity of 0.160 dl./g.

Analysis.—Total nitrogen, 16.9%; amide nitrogen, 0.30%; Van Slyke nitrogen, 0.57%; methoxyl, 4.78%.

(B) Crosslinking of esterified gelatin.—A mixture of 1.25 g. of esterified gelatin and 0.270 g. of potassium persulfate in 25 ml. of water was heated at 70° C. The solution set to a thick gel in 35 minutes. The crosslinked product was insoluble in hot water, acetic acid, and glycerol.

EXAMPLE IV

Crosslinking of a collagen-derived water-soluble protein

The protein used in these experiments was a water-soluble, extracted, refined, dry granular protein of collagen source. The protein has an isoelectric point of about 5, and a solution gives a pH of approximately 6. It has an estimated molecular weight of approximately 10,000. This protein is soluble in hot water, acetic acid, and glycerol.

(A) To 2.5 g. of the above protein in 25 ml. of water was added 0.23 g. of ammonium persulfate. The solution became a semi-gel after heating 2.5 hours at 70° C., and did not set to a firm gel on further heating at 70° C. The resulting protein was insoluble in hot water, acetic acid, and glycerol.

(B) The procedure of part A was repeated, but substituting of 0.54 g. of potassium persulfate for ammonium persulfate. The solution set to a thick gel after heating 1 hour at 70° C.

EXAMPLE V

Crosslinking of a water-soluble animal protein

The protein used in these experiments was an extracted, refined, dried, and ground protein from a collagen source. The protein has an isoelectric point of about 5, and a solution gives a pH of approximately 6. The estimated molecular weight of this protein is 20,000.

(A) A solution of 2.5 g. of the above protein and 0.46 g. of ammonium persulfate in 25 ml. of water was heated at 70° C. The solution set to a gel in 40 minutes. This gel could not be dissolved in hot water, acetic acid, or glycerol.

(B) The procedure of part A was repeated, but 0.92 g.

rather than 0.46 g. of ammonium persulfate was used. A similar result was obtained, the solution setting to a gel in 15 minutes.

EXAMPLE VI

Crosslinking of gelatin, using a redox system (A) To 2.5 g. of the gelatin described in Example I in 50 ml. of water was added 0.228 g. of ammonium persulfate and 0.010 g. of silver nitrate. After 55 minutes at 40° C., the solution set to a hot water-insoluble gel, which could not be redissolved in hot acetic acid or glycerol.

(B) To 2.5 g. of gelatin in 25 ml. of water was added 0.270 g. of potassium persulfate and 0.010 g. of silver nitrate. On standing at 40° C. for 45 minutes, the solution set to a firm gel.

EXAMPLE VII

Crosslinking of a collagen-derived water-soluble protein of molecular weight 10,000, using a redox system (A) To 2.5 g. of protein described in Example IV in 25 ml. of water was added 0.46 g. of ammonium persulfate and 0.10 g. of silver nitrate. On standing at room temperature (20° C.) for 10 minutes, the solution set to a gel, which could not be redissolved in hot water, acetic acid, or glycerol.

(B) The procedure of part A was repeated, but 0.05 g. rather than 0.10 g. of silver nitrate was added. A similar result was observed, with the solution setting to a gel in 15 minutes.

(C) The procedure of part A was repeated, but 0.23 g. of ammonium persulfate and 0.05 g. of silver nitrate was used. A similar result was observed, with gelation of the solution in 15 minutes.

(D) A solution of 5.0 g. of protein, 0.23 g. of ammonium persulfate, and 0.05 g. of silver nitrate in 25 ml. of water were allowed to stand at 20° C. After 2 hours the solution became semi-fluid and then gelled after 3 hours.

(E) The procedure was the same as part D, but 0.46 g. of ammonium persulfate and 0.05 g. of silver nitrate was used. The solution set to a gel in 10 minutes.

EXAMPLE VIII

Crosslinking of a water-soluble animal protein, using a redox system (A) To 2.5 g. of protein described in Example V in 25 ml. of water was added 0.46 g. of ammonium persulfate and 0.10 g. of silver nitrate. On standing at 20° C., the solution set to gel in less than 10 minutes. The resulting protein was insoluble in hot water, acetic acid, and glycerol.

Having thus described the invention, what is claimed is:

1. A process for preparing a crosslinked collagen which comprises reacting at about 20–40° C. an aqueous dispersion of a collagen, a water-soluble persulphate in an amount in the range from about 0.1 to about 2 parts thereof per part of collagen, and a reducing agent which forms a redox system with the persulphate, the said reaction being in a system wherein the sole reactants are the collagen, the persulphate, and the reducing agent, the said reducing agent being selected from the group consisting of alkali-metal sulphites, alkali-metal bisulphites, sulphur dioxide, sulphurous acid, ferrous salts, silver nitrate, and hydrazine salts.

2. The process of claim 1 wherein the reducing agent is silver nitrate.

3. The process of claim 1 wherein the reducing agent is silver nitrate and the collagen is gelatin.

References Cited

UNITED STATES PATENTS

| 142,892 | 9/1873 | Bretonniere | 260—125 |
| 2,928,822 | 3/1960 | Johnsen et al. | 260—117 |
| 3,083,118 | 3/1963 | Bridgeford | 117—47 |
| 3,272,639 | 9/1966 | Slocum | 106—125 |

FOREIGN PATENTS

| 585,794 | 10/1959 | Canada. |

WILLIAM H. SHORT, *Primary Examiner.*

HOWARD SCHAIN, *Assistant Examiner.*

U.S. Cl. X.R.

8—116.2, 115.6, 128, 129; 106—125; 117—138.8, 139.5, 143, 144, 144.5, 156, 164; 260—8, 123.7